(No Model.)  2 Sheets—Sheet 1.
D. S. BOYAKIN.
WATER ELEVATOR.
No. 298,344. Patented May 13, 1884.
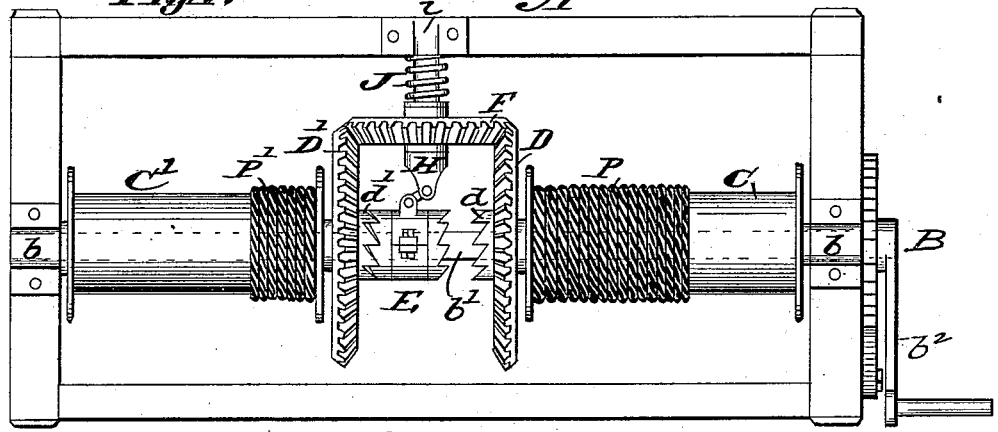
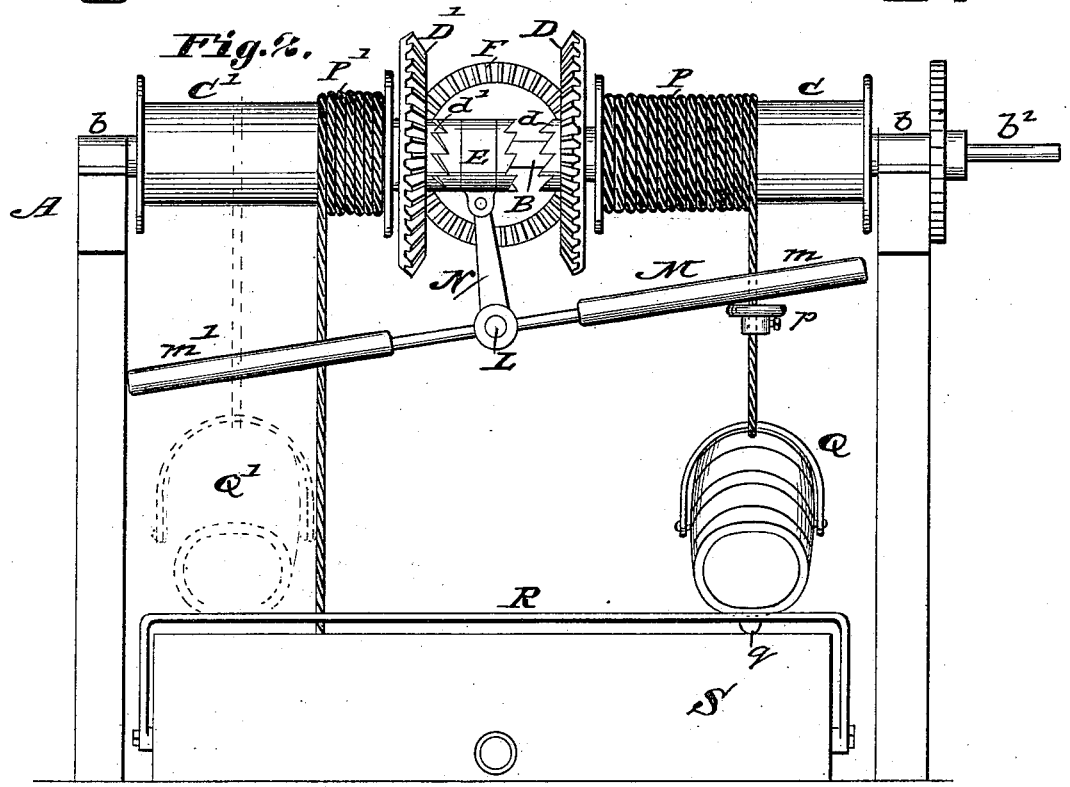
Attest:
Charles Pickle
James Holland
Inventor:
Dewitt S. Boyakin
by Paul Bakewell
att'y (No Model.) 2 Sheets—Sheet 2.

D. S. BOYAKIN.
WATER ELEVATOR.

No. 298,344. Patented May 13, 1884.

Attest:
Charles Pickles
James Holland

Inventor,
Dewitt S. Boyakin
G. Paul Bakewell
Atty

UNITED STATES PATENT OFFICE.

DEWITT S. BOYAKIN, OF ST. LOUIS, MISSOURI.

WATER-ELEVATOR.

SPECIFICATION forming part of Letters Patent No. 298,344, dated May 13, 1884.

Application filed September 6, 1883. (No model.)

*To all whom it may concern:*

Be it known that I, DEWITT S. BOYAKIN, of St. Louis, Missouri, have made a new and useful Improvement in Water-Elevators, of which the following is a full, clear, and exact description, reference being had to the annexed drawings, making part of this specification, in which—

Figure 3:
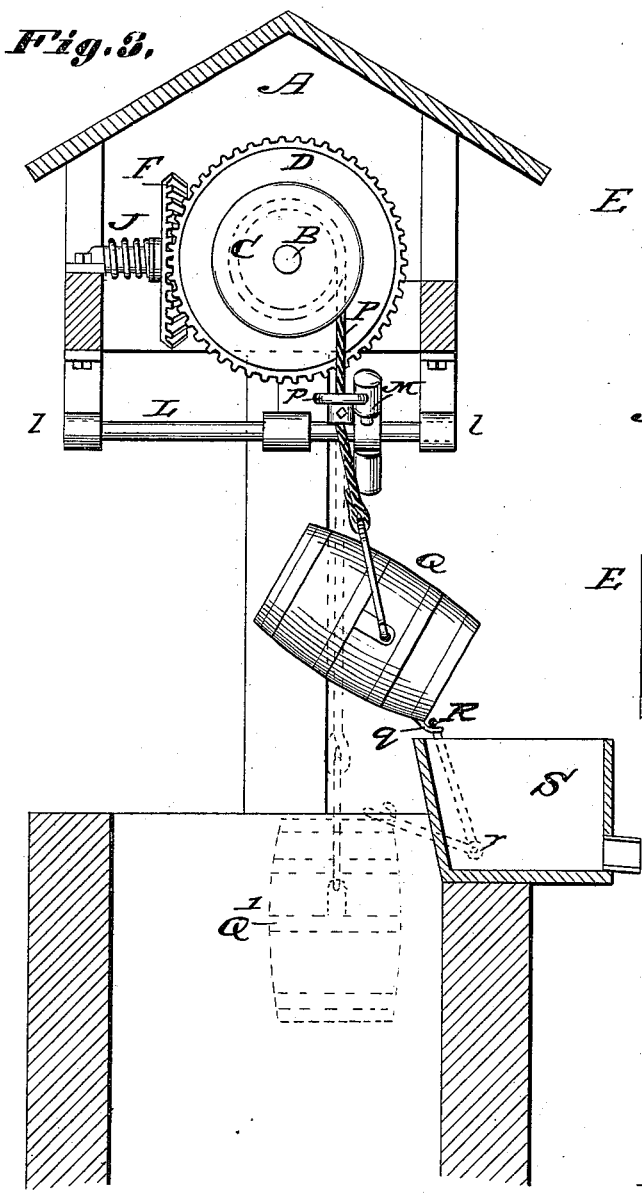
Figure 4:
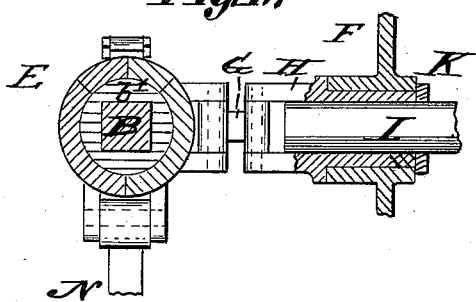
Figure 5:
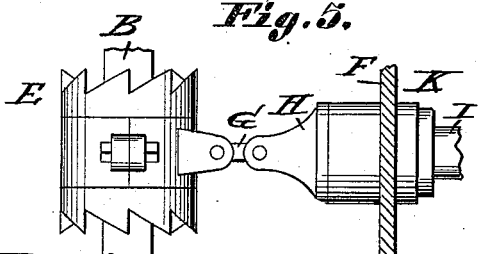

Figure 1 is a plan of the improved elevator; Fig. 2, a side elevation; Fig. 3, a sectional transverse elevation; and Figs. 4 and 5, details, Fig. 4 being a section of the clutch and the parts immediately therewith connected, and Fig. 5 being a plan of the parts shown in Fig. 4.

The same letters of reference denote the same parts.

The aim of the invention is to provide means by which the contents of the elevator can be automatically discharged.

A represents a well-curb. The shaft B is journaled at $b\ b$. A pair of drums, C C', provided, respectively, with the bevel-gears D D', are hung loosely upon the shaft B.

E represents a clutch arranged upon the shaft B between the gears D D', and capable of being slipped upon the shaft, and by means of the clutch parts $d\ d'$, respectively attached to the gears D D', brought alternately into engagement with the gears D D'. The shaft B at $b'$ is suitably squared or otherwise shaped so as to cause the clutch E to rotate with the shaft. F represents a bevel-gear in engagement with the gears D D'. The clutch E, by means of the link G, is jointed to a sleeve, H, upon the shaft I. This shaft I is held in the bearing $i$. It sustains the sleeve H, and the sleeve in turn sustains the gear F, and the sleeve and gear are capable of being moved longitudinally upon the shaft I. A spring, J, bearing at one end against the bearing $i$ and at the other end against the collar K, acts to press the gear F into engagement with the gears D D', and to move the sleeve toward the clutch E. When the clutch is in engagement with either of the clutch parts $d\ d'$, the relative positions of the clutch and sleeve are as shown in Fig. 1, the center of the clutch being out of line with the center of the sleeve. When the clutch is slipped upon the shaft B, to be thrown into engagement with the other of the clutch parts $d\ d'$, the link G acts to press the sleeve H and the gear F upon the shaft I toward the bearing $i$ until the center of the clutch has passed the center of the sleeve, whereupon the spring J acts to press the gear F and the sleeve H back again. When the clutch and sleeve are in line, as in Fig. 5, the gear F is disengaged from the gears D D'; but as soon as the clutch in its movement has passed the sleeve H the gear F is thrown into engagement again with the gears D D'. A shaft, L, is journaled in the bearings $l\ l$ in the curb. A lever, M, is fastened to the shaft L. An arm, N, at one end is fastened to the shaft L, and at the other is jointed to the clutch E. The lever M extends across the curb beneath the drums C C', and so as to come in the way of the lines P P', which are respectively wound upon the drums C C', and to which lines the elevator-buckets Q Q' are respectively attached. The lines P P' are in the vicinity of the buckets provided with projections, such as the collar $p$. The operation of the invention is as follows: The shaft B, by means of the crank $b^2$, is rotated continuously in the same direction. Let the clutch E be adjusted upon the shaft B so as to be in engagement, say, with the gear D. As the bucket Q is elevated, the projection $p$ encounters one end, $m$, of the lever M, causing that end of the lever to be lifted. This in turn causes the shaft L to be rotated, and through the arm N to shift the clutch E upon the shaft B, and to bring the clutch into engagement with the opposite gear, D', as shown in Fig. 2. The gear D' and the drum C' are then rotated so as to wind up the bucket Q'. As the gear D' is thus rotated in the direction described, it transmits its motion through the gear F to the gear D, causing the line P to unwind upon the drum C, and to lower the bucket Q into the well. The motion of the gear D' and the drum C' continues until the bucket Q' is wound up sufficiently for the stop upon its line P' to encounter the other end, $m'$, of the lever M, whereupon that end of the lever M is raised, causing the clutch E to be slipped upon the shaft B and brought into engagement with the gear D, whereupon the movement of the gears D D' F is reversed, causing the drum C' to unwind its bucket Q', and the drum C to wind up its bucket Q, and so on, the lever M being tilted and the movements of the gears being reversed as the buckets are alternately elevated. Each bucket is provided with a hook, $q$, which, as the bucket is raised, encounters a swinging bail, R, which is pivoted at $r$. The bail acts to draw the bucket into the position shown in Fig. 3, and to discharge its contents into a suitable trough, S. When the bucket is lowered, the bail drops back again and the bucket-hook becomes disengaged therefrom. Thus while the buckets Q Q' are alternately lowered and elevated and emptied the shaft B is continuously worked in the same direction.

I claim—

1. The combination of the shaft B, squared at $b'$, the clutch E, and means for operating the same, the link G, the shaft I, and the sleeve H, substantially as described.

2. The combination of the shaft B, the clutch E and means for operating the same, the gears D D' F, the parts $d\ d'$, the link G, the sleeve H, and the shaft I, substantially as described.

3. The shaft I, the spring J, the bearing $i$, the collar K, the gears D D' F, and the shaft B, in combination with operative means, substantially as described.

4. The shafts B I, the gears D D' F, the clutch E and means for operating the same, the parts $d\ d'$, the link G, the sleeve H, and the spring J, in combination substantially as described.

5. The combination of the shafts B I, the drums C C', the gears D D' F, the parts $d\ d'$, the clutch E and means for operating the same, the link G, the sleeve H, and the spring J, substantially as described.

6. The combination of the shafts B I, the drums C C', the gears D D' F, the clutch E, the link G, the sleeve H, the spring J, the lines P P', the projections $p$, the lever M, and the arm N, substantially as described.

In testimony whereof I have affixed my signature, in presence of two witnesses, this 1st day of September, 1883.

D. S. BOYAKIN.

Witnesses:
PAUL BAKEWELL,
J. W. RIDDLE.